United States Patent [19]

Koerber et al.

[11] Patent Number: 5,581,755

[45] Date of Patent: Dec. 3, 1996

[54] METHOD FOR MAINTAINING A HISTORY OF SYSTEM DATA AND PROCESSES FOR AN ENTERPRISE

[75] Inventors: Paul D. Koerber, Mission Viejo; Ronald J. Neubauer, Thousand Oaks, both of Calif.

[73] Assignee: Unisys Corporation, Blue Bell, Pa.

[21] Appl. No.: 381,580

[22] Filed: Jan. 31, 1995

[51] Int. Cl.⁶ ..................................................... G06F 17/00
[52] U.S. Cl. ........................ 395/614; 395/670; 395/701; 364/DIG. 1; 364/268; 364/964.34; 364/DIG. 2
[58] Field of Search ..................................... 395/600, 650, 395/700, 575

[56] References Cited

U.S. PATENT DOCUMENTS

| | | | |
|---|---|---|---|
| 4,853,843 | 8/1989 | Ecklund | 364/200 |
| 5,261,098 | 11/1993 | Katin et al. | 395/650 |
| 5,317,729 | 5/1994 | Mukherjee et al. | 395/600 |
| 5,347,653 | 9/1994 | Flynn et al. | 395/600 |
| 5,361,350 | 11/1994 | Conner et al. | 395/600 |
| 5,386,559 | 1/1995 | Eisenberg et al. | 395/600 |
| 5,418,964 | 5/1995 | Conner et al. | 395/700 |
| 5,428,792 | 6/1995 | Conner et al. | 395/700 |
| 5,459,827 | 10/1995 | Allouche et al. | 395/148 |

*Primary Examiner*—Thomas G. Black
*Assistant Examiner*—C. Pham
*Attorney, Agent, or Firm*—J. Ronald Richebourg; Mark T. Starr; Steven R. Petersen

[57] ABSTRACT

The method of the present invention is useful in a computer system having a user interface, a memory, a repository and a database. The method is a repository program executed by the computer system for maintaining a history of objects stored in the repository. The method comprises the steps of determining if the object is a new logical object, and if so constructing a new versioned object; and, if not retrieving from the repository an object on which a new state is to be based. If the new state is being derived from only one object, then reserving the object. If the state is being derived from two objects, then retrieving from the repository the other object on which the new state is based, and merging the two objects. If the state changes are to be retained, then replacing the object; and, if the state changes are not to be retained, then unreserving the object.

14 Claims, 10 Drawing Sheets

METHOD FOR MAINTAINING A HISTORY OF SYSTEM DATA AND PROCESSES FOR AN ENTERPRISE

FIELD OF THE INVENTION

The present invention relates in general to the field of repository databases and in particular to a method for maintaining a history of system data and processes for an enterprise.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. A repository is like a card catalog that is found in the library, with the library being analogous to the database.

With the advent of repositories, improvements in the accessibility of data within databases has improved. However, as these repositories have become larger and more complex a method is required to maintain a history of system data and processes for an enterprise.

BRIEF SUMMARY OF THE INVENTION

It is therefore an object of the present invention to provide an improved repository system.

It is another object of the present invention to provide an improved repository which supports a method for maintaining a history of system data and processes in an enterprise.

The method of the present invention is useful in a computer system having a user interface, a memory, a repository and a database. The method is a repository program executed by the computer system for maintaining a history of objects stored in the repository. The method comprises the steps of determining if the object is a new logical object, and if so constructing a new versioned object; and, if not retrieving from the repository an object on which a new state is to be based. If the new state is being derived from only one object, then reserving the object. If the state is being derived from two objects, then retrieving from the repository the other object on which the new state is based, and merging the two objects. If the state changes are to be retained, then replacing the object; and, if the state changes are not to be retained, then unreserving the object.

DETAILED DESCRIPTION

Before proceeding with a detailed description of the method of the present invention a background discussion of repositories in which the present invention is useful would be helpful. In general, a repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules.

Figure 1:
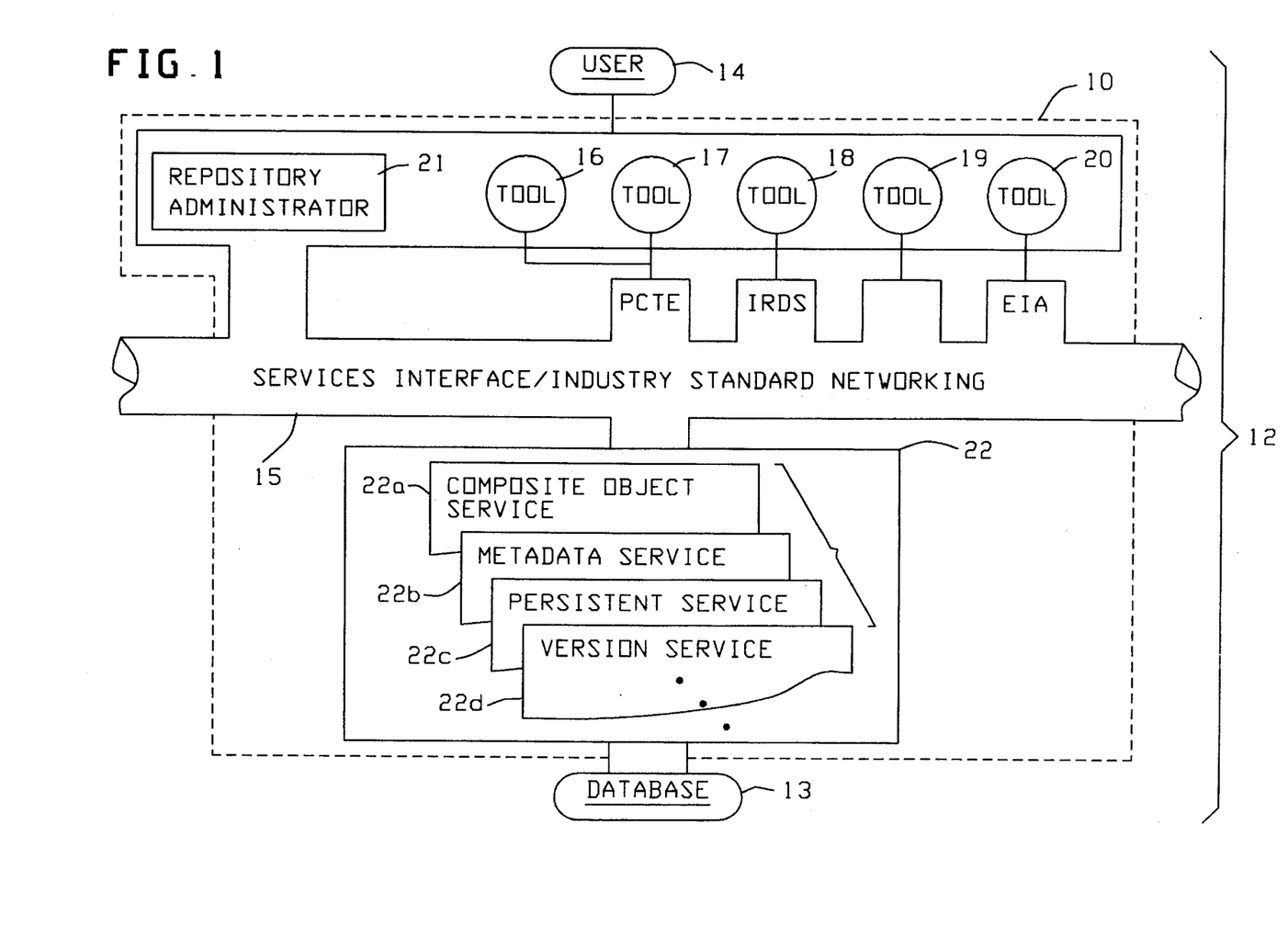
FIG. 1 is a block diagram of a computer system showing the various components of hardware and software that support a repository employing the method of the present invention.

Referring now to the drawings and FIG. 1 in particular, a block diagram is shown of a computer system 12 including a repository 10 that may use the method of the present invention. The repository 10 is illustrated as being supported by or a part of an information system 12 having a user interface 14. Tools 16–20 (such as CASE tools), which are integrated within the repository 10, are coupled to a services interface 15. The tools 16 and 17 are coupled to the interface 15 by means of an interface agent identified as Portable Common Tool Environment ("PCTE"), tool 18 is coupled to the interface 15 by means of an Information Resource Dictionary System ("IRDS") and tool 20 is coupled to the interface by means of an Electronic Industry Associates ("EIA") interface agent. The point here is to illustrate the flexibility of use of a variety of tools and interface agents with the repository 10.

An administrator 21 manages the repository 10, the database 13 and the environment around the repository. The administrator 21 is typically a work station that can manage a single repository or a network of repositories.

A service library 22 provides the functionality that enables the user to store, manage and reuse repository information. Examples of services within the library 22 are Composite Object Service 22a, which is disclosed in a copending patent application Ser. No. 08/381,574 assigned to the assignee of this application and entitled IN AN OBJECT ORIENTED REPOSITORY, A METHOD OF TREATING A GROUP OF OBJECTS AS A SINGLE OBJECT; and MetaData Service 22b, which is disclosed in a copending patent application Ser. No. 08/382,303 also assigned to the assignee of this application and entitled A METHOD FOR SUPPORTING OBJECT MODELING IN A REPOSITORY. Another library service, Persistent Service 22c, deals with definition, tracking and maintenance of objects that continue to exist beyond the execution of a particular tool or of the repository itself. The Persistent Service 22c is disclosed in yet another co-pending patent application Ser. No. 08/506,674, which is assigned to the same assignee as this application. Yet another library service, Version Service 22d, is the subject of this patent application. It is noted that many more types of library services may form a part of such a repository, the details of which are beyond the scope of this disclosure.

The repository employing the present invention provides a client/server architecture in which clients, i.e. tools 16–20, request services form the server, i.e. the repository 10 and its service library 22. In return, the repository and its service library 22 respond to requests from client tools 16–20. A repository client is software that accesses or modifies information that is maintained by the repository. The repository client uses the service library 22 (i.e., the server), which includes software integrated into the repository to manage repository information and provide services to users of that information. It is noted that software in the repository can act both as a repository client when the software is requesting a service from some other repository software and as a repository server when the software is providing a service to some other repository software.

It is pointed out that a SPARC system manufactured by Sun Microsystems, Inc. of Mountain View, Calif., was used for executing one embodiment of the method of the present invention, which method was written in C++ programming language.

As a repository user, one can access the information in the repository through the tools 16–20 that have been integrated within the repository. In the context of a repository, a "tool" is any application software that creates, modifies or uses information in the repository. Tools primarily use the repository for sharing information with other tools and tool users. For example, a COBOL compiler and a user-interface tool can share the definition of a data structure. Tools also benefit from using the repository services that provide features such as a version control and network distribution. A wide variety of tools serving many diverse purposes can use a repository. A catalog of such tools includes integrated computer-aided software engineering (CASE) and fourth generation language (4GL) tools, enterprise modeling tools, analysis and design specification tools, project planning tools, word processors, graphics tools, source code editors, compilers, linkers, debuggers, etc.

The method of the present invention, or the version service 22d, enables the user to store a complex structure in the repository. For example, to store a complex program in the repository the user might define one type to represent the program as a whole, one type to represent the code modules, and another type to represent the data files. The user then stores the actual code modules and data files as instances of these types. The program object is the composite object that links the modules and files to represent the unified program.

The version service enables a user to record changes to objects over time and thus maintain information about the previous states of these objects. In other words, version information provides a history of the system, data and processes for an information system.

At this juncture of the description several definitions would be helpful.

Types

A type is a template that describes a set of features—the state and behavior—that an object or another type can possess. A type defines a pattern that can be used to create or identify objects; it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values.

The values represented by the data types do not exist as separate objects in the repository. Instead, they are always sorted as part of a repository object.

Persistent types define objects that continue to exist within the repository beyond the execution of a particular tool or of the repository. These persistent objects are essentially permanent-they remain in the repository until they are explicitly deleted by users. The majority of repository types are persistent.

A transient type defines a temporary object that will be automatically deleted when the function or program in which the object was created exists or terminates. Transient types are provided in the model to support exchange of data between an application and the repository.

A type that can be used to define other types and objects is said to be instantiable. Objects derived from a type are called instances of that type. Types derived from a type are called subtypes of that type. Instances and subtypes of a type inherit the features—attributes, references, and operations-defined for that type. The repository User type is an example of an instantiable type. A type that is used to define only other types and not objects is said to be abstract.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes.

A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

Features

A feature defines some element of either the state or the behavior that objects can possess. A feature is defined for a type, but applied to the corresponding objects. The repository has two kinds of features: operations and properties. For example, the Employee type might define the features name, birthDate, salary, and setSalary. Each employee object is subsequently considered to possess these features. That is, each employee has a name, a birth date, and salary. The employee's salary can be modified by using the setSalary feature.

There are two basic categories of features: properties and operations. Properties define state. For example, the salary feature is a property that defines an employee's current salary. Operations define behavior. For example, the setSalary feature is an operation that defines the mechanism for changing an employee's salary.

Properties

A property is a feature that represents a state that objects can possess. (In some models, properties are called instance variables.) A property can represent either a single value or a set of values. Properties are further divided into attributes, whose values are embedded within the owning objects, and references, whose values are independent objects.

The repository supports the following kinds of properties:
Attribute

A property for which the value is embedded within the owning object. For example, an employee's social security number can be defined as an attribute whose value is stored as a string within the employee object.
Reference A property for which the value is maintained outside the owning object. For example, the employee's manager can be defined as a reference that identifies a separate employee object that represents the manager.

Every property has a domain that identifies the objects that the value of the property can hold. The domain is defined as a type. Objects that are instances of the type are legal values for the property. For example, the domain of the boss property of the Employee type might be specified as the Manager type. Therefore, only a manager object can be designated as the boss of an employee.

When an object is first created, none of its properties have values until they are implicitly assigned a default value or explicitly assigned a value by the construct operation. Until a property has a value it is considered undefined. For properties that are references, the value is considered null. The state of being null is not a value itself. Rather, it means that no value exists.

A property for which the value is embedded within the owning object is called an attribute. Such a property typically is used for simple values that are not shared between multiple owning objects. For example, the Employee property birthDate is simply a Date object—that is, the domain of the birthDate property is the Date type. If one employee's birthDate property is changed, the change does not affect other employees whose birthDate property is the same date. Consequently, each employee object should use a "private" date object that is embedded within it—that is, as an attribute.

A property for which the value is maintained outside the owning object is called a reference. For a reference, the owning object points to the value object. One reason for defining a property as a reference is to allow object sharing. A reference enables two or more owning objects to have the same value for a property. All owning objects can point to the same value object. For example, if two employees have the same manager as a boss, they share the same manager object. Consequently, any changes to the manager (such as changing his or her name) are reflected when the boss reference is accessed for all employees that have that boss.

A property that has one value for each object is said to be single valued. For example, each employee has one name and one birth date. A property that has more than one value for each object is said to be multi-valued. For example, each manager manages multiple employees, so the staff property for a manager object must be able to reference multiple values. A multi-valued property is defined by specifying a collection as its domain. A collection represents a set of values. A collection provides the ability to count the values defined for a multi-valued property, to add new values to the property, and to delete existing values.

The repository supports several types of collections, each of which organizes elements in a different manner. This capability enables the user to:
Store and retrieve the elements in a special order; and,
Search for elements in a special way.

The collection types supported by the repository are summarized in the following table:

| Type  | Description |
| --- | --- |
| Array | Creates a dynamic array of objects in which an integer index can be used to access array members. An array can contain duplicate objects. |
| List  | Creates an ordered collection of objects. A list can contain duplicate objects. |
| Set   | Creates an unordered collection of objects. Objects in a set must be unique. |

Operations

An operation is a feature that represents a behavior that objects can possess. An operation can be thought of as a function: it has a name, an optional set of parameters, and an optional return type. Like properties, operations are applied to each object within the owning type. Consequently, an operation is generally invoked in the context of a specific object.

An operation can have parameters that identify information a caller must provide when invoking the operation. If an operation has no parameters, a caller merely invokes the operation for the desired object. For example, consider the following features:

| Type | Feature | Domain/Return Type |
| --- | --- | --- |
| Employee | birthDate (attribute) age (operation) | Date Integer |

As shown, the birthDate attribute has a domain of Date. Age is an operation (with no parameters) whose return type is Integer. The purpose of age is to compute an employee's current age (in years) from his or her birth date. Because the age operation is invoked for a specific employee, it is able to obtain the value of that employee's birthDate attribute, make the necessary computation, and return the appropriate integer without requiring parameters.

When an operation has parameters, each parameter has semantics similar to those of properties. Each parameter has a name, a domain type, and a set of options that can be used to affect the behavior of the parameter. The following table shows an example of an operation, defined for the Employee type, that has parameters:

| Operation | Parameter | Parameter Domain | Parameter Options |
|---|---|---|---|
| setSalary | amount | Real | REQUIRED |
| | authorizedBy | Manager | REQUIRED |
| | effective | Date | DEFAULT today's date |

The setSalary operation has three parameters:

The amount parameter is a Real number (floating-point) that is required. Therefore, the caller must specify a value for this parameter.

The authorizedBy parameter is a Manager object that also is required.

The effective parameter is a date parameter that is not required. However, if the caller does not specify a value for this parameter, the current system date is used by default.

A multi-valued parameter is a set, or collection, of values. Such a parameter is useful when the operation must operate on several objects even though it is invoked in the context of a single object. An operation optionally can return an object when it completes processing, just as a program function can return a value. An operation that returns an object is called typed because it has a return type specified. An operation that does not return an object is called un-typed because it does not have a return type specified. A return type must be one of the types recognized by the repository. An operation can return a set of objects by specifying a collection as its return type.

An operation can be defined for a type and then redefined for each subtype of the original type. This process is called overriding an operation.

When an operation is overridden, a subtype that inherits the operation has a separate method that redefines the functionality of that operation. The technique that the repository uses to choose which method to call for a given operation is called dynamic binding.

Dynamic binding (also called polymorphism) means that the repository chooses the method that is most specific for a given object and operation. The most specific method is the one defined in the lowest subtype of which the object is an instance.

For example, assume setSalary is an operation defined for the Employee type. An employee object can be an instance of the Employee type or one of its subtypes.

If you call the setSalary operation for an object that is an Employee instance, the repository selects the method associated with the setSalary operation defined for the employee type.

If you call the setSalary operation for an object that is a Manager instance, the repository selects the method associated with the setSalary operation as it is redefined for the Manager type. If the Manager type does not redefine the setSalary operation, the repository selects the method associated with the setSalary operation defined for the Employee type as the immediate supertype of the Manager type.

You can define an operation to be called with different sets of parameters. For example, you might define the setSalary operation to be called with only an amount parameter or with both an amount parameter and an effectiveDate parameter.

Each combination of parameters that an operation can accept is called a signature. To define multiple signatures for an operation, you define the operation more than once in the same owner type and use the desired signature for each definition.

Methods

The operations defined for a model form an interface that can be seen by a caller. Separate from this definition, each operation must be implemented by a module of code called a method. Methods are typically written as separate functions and bound into a set of code libraries. The method code library name for each operation is then identified to the repository as part of the definition of the operation.

When a caller invokes an operation, the request is received by the repository, which finds and calls the appropriate method. The operation passes to the method the appropriate parameters. When a method is called, it can then act as a caller and call back into the repository to invoke other operations. Consequently, a method can be thought of as a specialized kind of application program.

Objects

An object is an abstract representation of a real-world concept or thing—such as a person, a software package, or an event—that is stored in the repository. In the repository, the state of an object is represented by the values of the properties defined for the type. For example, the state of an integer is its numeric value. The state of a person is its name, birthDate, spouse and so on.

The behavior of an object is the set of functions that the object can perform. In the repository, the behavior of an object is represented by the operations defined for the owner type. A characteristic of object behavior is the ability to return some of its state to a requester. For example, the object person can return its name. For this reason, some object models describe object behavior as the set of messages that an object can receive and respond to. One example of object behavior is the capability an integer has to perform such functions as addition, square root and absolute value.

A Component Object is a versioned object (i.e., a particular historical state of an object) that is part of a composite object. The relationship of the component object to the composite object is defined by a composition relationship. A component object can itself be a composite object. In this case, the component object contains other component objects related to it by composition relationships. A component object can belong to several composite objects. This feature promotes sharing of objects in the repository.

A Composite Context is a type that defines the scope of a composite hierarchy. The composite context identifies the top object for the hierarchy and the ghost objects that were created while the context was the current composite context. The term ghost as used herein means a value associated with a changeable object. Objects with ghost status can only be viewed in certain situations, i.e. they are only visible in the context in which they were created.

A Composite Hierarchy is a tree structure composed of a composite object and its component objects. The hierarchy also includes the component objects for any component object that is itself a composite object. Thus, this structure defines the component objects of the top, or root object, the components of those components, and so on to the bottom of the hierarchy.

A Composite Object is a versioned object (i.e., for which at least one composite relationship is defined thus allowing the object to have components. A composite object can be thought of as owning its component objects. Some examples of these are: a car engine-the component objects include spark plugs, wires and pistons; a program the component objects include files, record layouts and modules; a menu-the component objects are the various selections on the menu.

A Composite Relationship is the relationship that links a composite object to its component objects. The relationship between a car engine and its parts-spark plugs, pistons, wires and so on-can be used to illustrate a composite relationship. The car engine and its components can be treated as a single object, yet each of the parts can be accessed individually.

The term Visibility is used with versioned objects whose reserveStatus value is ghost. A ghost object is visible only in the composite context in which it was created. When this composite context is the current object, one can change the attributes of the ghost object, add or remove an object from the attributes of another object and so on.

Figure 2:
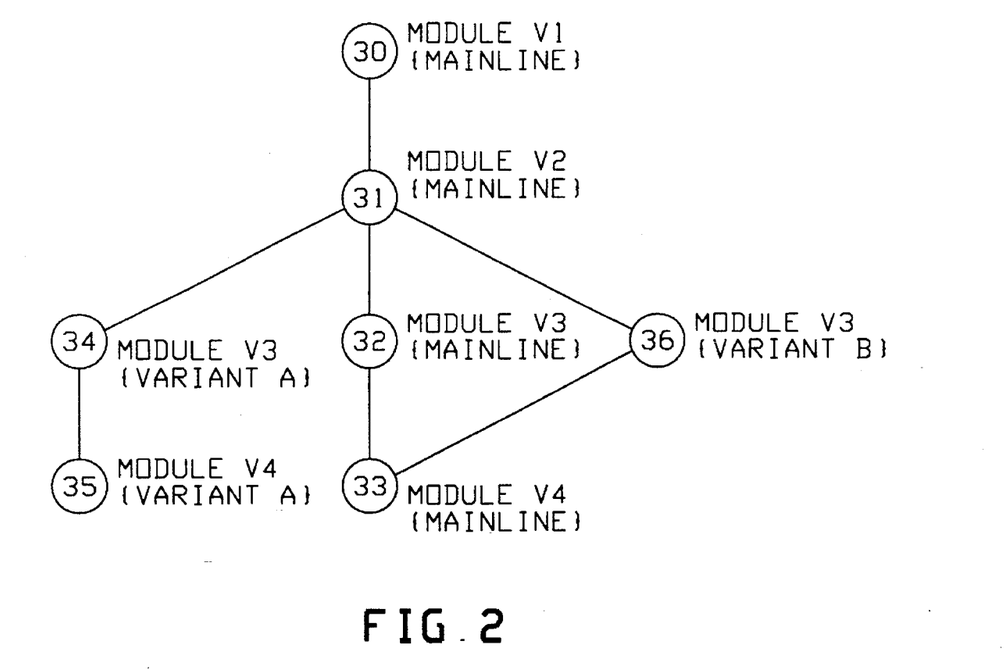
FIG. 2 is a version graph for a versionable repository object called Module.

A Versionable Object is a repository object for which the version service records state changes over time. Each Module in FIG. 2 is a versionable object. A Versioned Object is a repository object that represents a particular historical state of a versionable object. In FIG. 2 each circle stands for a versioned object that represents a particular state of Module.

A version graph represents the historical states of a versionable object in the repository. FIG. 2 shows an example of a version graph for a versionable repository object called Module. The following definitions will be helpful in understanding this invention when taken in conjunction with the graph shown in FIG. 2.

A Variant Branch, which represents a single line of development, is a subset of versioned objects in a version graph. The variant branch is a linear path that shows the history of changes from one versioned object to another for a particular line of development. In FIG. 2, the version graph has three variant branches-mainline, variant A and variant B. The mainline branch is made up of objects 30 through 33. The variant A branch is the path including objects 34 and 35 (labeled Module v1 {mainline} and Module v4 {variant}). The variant B branch is the path including object 36 (labeled Module v3 {variant B}).

A Variant is a versioned object on a variant branch. A version graph can contain multiple variants at the same level of ancestry. The terms Variant and Versioned Object are interchangeable. In FIG. 2 there are two variants of Module-objects 34 and 35 on the variant A branch and object 33 on the mainline branch-as the final level (v4) represents in FIG. 2. The method of the present invention identifies each variant by its version number and its variant name.

A Version member is the first of two identifiers used by the method of this invention to distinguish a versioned object in a version graph. This number is an integer that represents a level of ancestry in the version graph. In FIG. 2 the version number is represented by a lowercase "v" followed by an integer. For example, the root Module is labeled v1. At the second level of the graph, the object derived from the root object is labeled v2.

The Variant Name is the second of two identifiers used by the method of this invention to distinguish a Versioned Object in a version graph. This name is a string that distinguishes a particular variant branch in the version graph. The Variant Name supports the maintenance of parallel lines of development. A Versioned Object can have many descendant variants representing different lines of development. In FIG. 2 the Variant Name is shown in square brackets. For example the main line of development is labeled {mainline}.

The method of this invention uses the check-in/check-out model for creating and controlling versions of objects. This model requires that a versioned object be checked out before it can be modified. This step places the object in a state in which it can be modified. When the modifications have been completed the versioned object must be checked back in. As the objects are checked in and out, the reserved status changes. The method of this invention enables one to determine whether the history of certain state changes to versionable objects should be retained.

Figure 3:
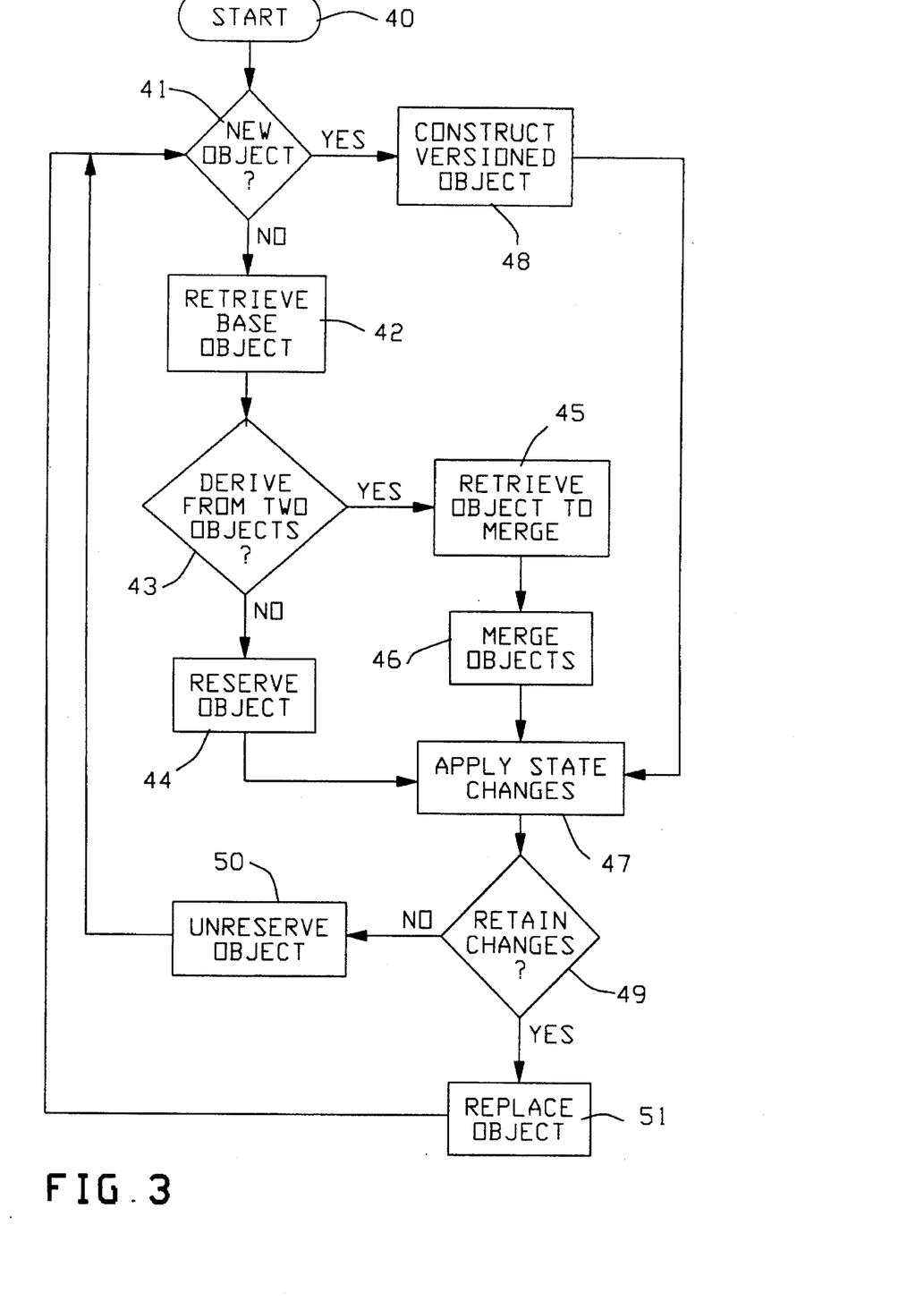
FIG. 3 is an overall process flow chart for maintaining the history of objects in the repository.

Referring now to FIG. 3, an overall flow chart illustrates the steps performed for maintaining a history of objects in the repository. Beginning with a START bubble 40, an inquiry is made as to whether or not the object is a new object, decision diamond 41. If the answer is NO then a branch is made to a process step of retrieving a base object, block 42. That is, the object on which the new state is to be based is returned from the repository. Next, another inquiry is made as to whether or not the object is derived from two objects, decision diamond 43. If the answer is NO; i.e., the new state is derived from only one object, then a branch is made to another process step wherein the object is reserved, block 44. The reserve operation is amplified further hereinafter in conjunction with the description of FIGS. 5a and 5b hereof.

If the object to be created is derived from two objects; i.e., exit the YES branch from the diamond 43, then the object on which the new state is based is retrieved from the repository, process block 45. Following this step, the two objects are merged, process block 46. The merge operation is amplified hereinafter and is set forth in FIG. 7 hereof. Next, any necessary state changes are made to the object, process block 47. After the object is reserved then the same state change step is performed on the reserved object.

An inquiry is next made as to whether or not the state changes are to be retained, decision diamond 49. If the answer to this inquiry is NO, then the object is "unreserved", as depicted by a process block 50. The unreserve operation is amplified further hereinbelow in conjunction with the description of FIG. 9. On the other hand, if the changes are to be retained then the YES branch is taken from the diamond 49 to a process step 51 wherein the object is replaced. The replace operation is amplified further hereinbelow and is set forth in FIG. 8. After this process step as well as the unreserve object step 50, a return is made back to the decision diamond 41 for the next object.

Figure 4:
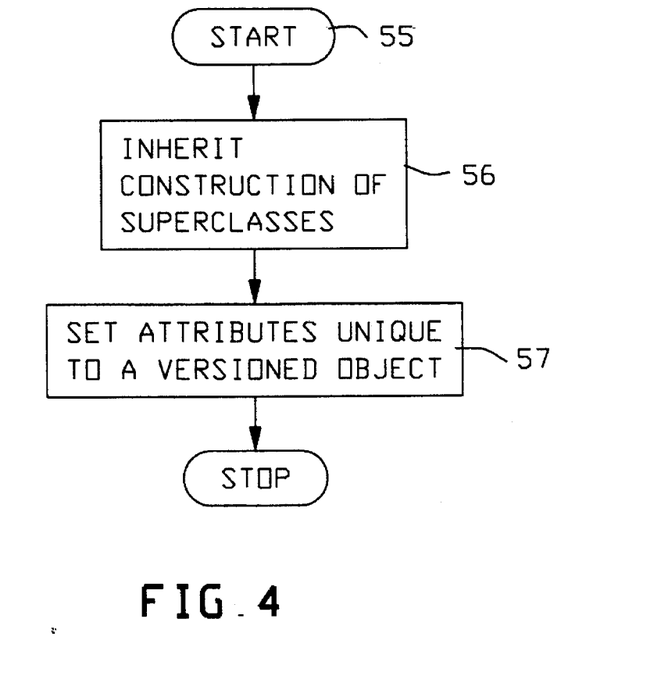
FIG. 4 is a flow chart illustrating the construction of a new versioned object.

Referring now to FIG. 4, a flow chart is shown that illustrates the steps in constructing a new versioned object. The process begins with a START bubble 55. Next, the new object is brought into existence, which has the initial values of the properties of the versioned object's superclasses established. This process step is depicted by a block 56 labeled Inherit Construction of Superclasses. Following this step, the version number is set to one (1), the reserve status is set to ghost, the next and previous versions are set to null and the variant is set to blank. The newly constructed object is returned to the caller. This process step is depicted by a process block 57 labeled Set Attributes Unique to a Versioned Object.

Figure 5A:
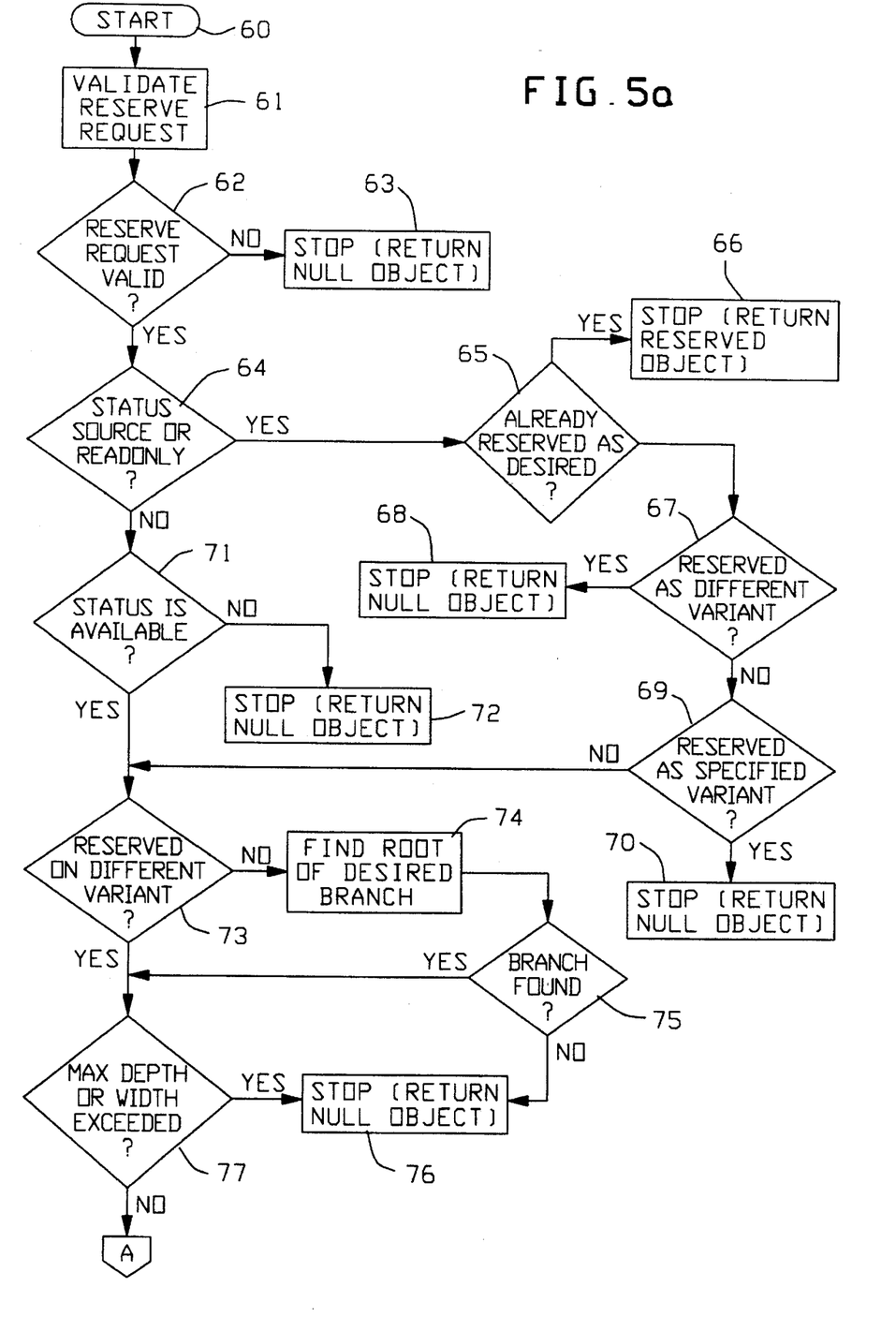
FIGS. 5a and 5b combined show a flow chart for reserving objects in the repository.
Figure 5B:
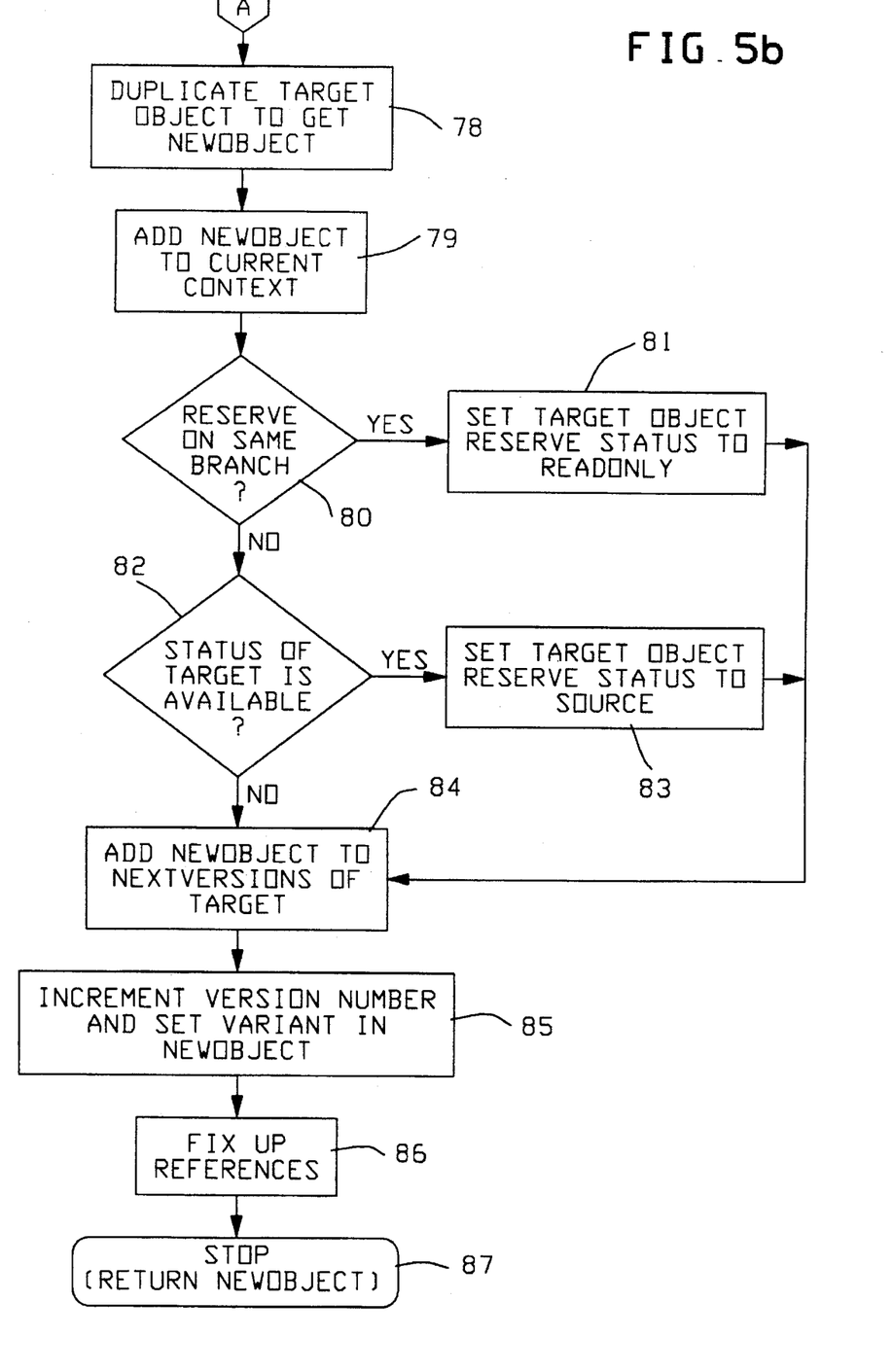

Referring now to FIGS. 5a and 5b, the steps performed in reserving objects in the repository is shown in flow chart form. The process begins with a START bubble 60, followed by a step of validating the reserve request by insuring that the requested variant name is valid and the target object is not a ghost, as depicted by a process block 61. Next an inquiry is made as to whether or not the reserve request is valid, decision diamond 62. If the request is not valid then a null object is returned, process block 63. On the other hand, if the reserve status of the target object is source or readOnly, the desired ghost may already exist, as depicted by a decision diamond 64. If there is already a derived ghost in the working context on the desired branch, then that object is returned, decision diamond 65 and process block 66, respectively. On the other hand, if not then a branch is taken to yet another decision diamond 67 for the inquiry "reserved as different variant"? That is, if there is already a ghost in the working context not on the desired branch, the object cannot be reserved again so a null object is returned to the caller, process block 68.

If the answer to the inquiry in diamond 67 is NO, then a branch is taken to still another decision diamond 69 to inquire if the object is reserved as a specified variant. That is, if the object is already reserved as the desired variant but not in the working context, it cannot be reserved again on the same branch. Thus, a null object is returned to the caller, process block 70. Returning to the decision diamond 64, if the reserve status of the target object is not source or readOnly, then a branch is taken to another decision diamond 71 inquiring as to the status availability. That is, if the reserve status is not available (i.e., it must be in an unknown state), the reserve is not possible. Thus, a null object is returned to the caller, process block 72. However, if it is available, a branch is taken to a decision diamond 73 inquiring if the reserve is on a different variant. That is, if the request is to create the new ghost object on a different variant branch than the target object, then an attempt is made to locate that variant branch in the version graph (e.g., FIG. 2). This latter process step is depicted by a process block 74. Following this step, an inquiry is made (decision diamond 75) as to whether or not the branch is found. If the variant was found, the variant name is already in use elsewhere in the graph so the reserve is not possible. Hence, a null object is returned to the caller, process block 76.

If the maximum allowed depth of a version graph or the maximum number of immediate descendants allowed for one object will be exceeded, then a null object is returned to the caller, decision diamond 77 and the process block 76, respectively. On the other hand, if an opposite answer is reached at the decision diamond 77, then a branch is taken to a process block 78 on FIG. 5b (via a connecting symbol A), for duplicating the target object to derive the starting state of the new ghost object. Next, the new object is added to the list of objects in the working context, process block 79. If the reserve was performed on the same branch as the target object, then the reserve status of the target object is set to readOnly, decision diamond 80 and process block 81, respectively. If the reserve was performed on a different branch then another inquiry is made at a decision diamond 82 as to whether or not the reserve status of the target object is available. If the answer to this inquiry is YES, then the reserve status of the target object is set to source, process block 83. Regardless, the new object is added to the next-Versions list of the target object so the descendant relationship is captured, as depicted by a process block 84. It should be pointed out that following the steps depicted by the process blocks 81 and 83 that a return is made to the process block 84 for the step of adding to the list.

Following the above, the version number of the new object is incremented by one (when the object was first duplicated, the version number of the target object had been copied) and setting the variant name of the new object as requested. This step of the process is depicted by a process block 85. Next, the references to and from the new ghost are fixed up, and the newly created ghost object is returned to the caller, process blocks 86 and 87, respectively. Note that if the target object state had indicated that the reserve request was not valid, a null object would be returned to the caller. The step of fixing up the references is amplified further hereinafter and illustrated in greater detail in FIG. 6.

Figure 6:
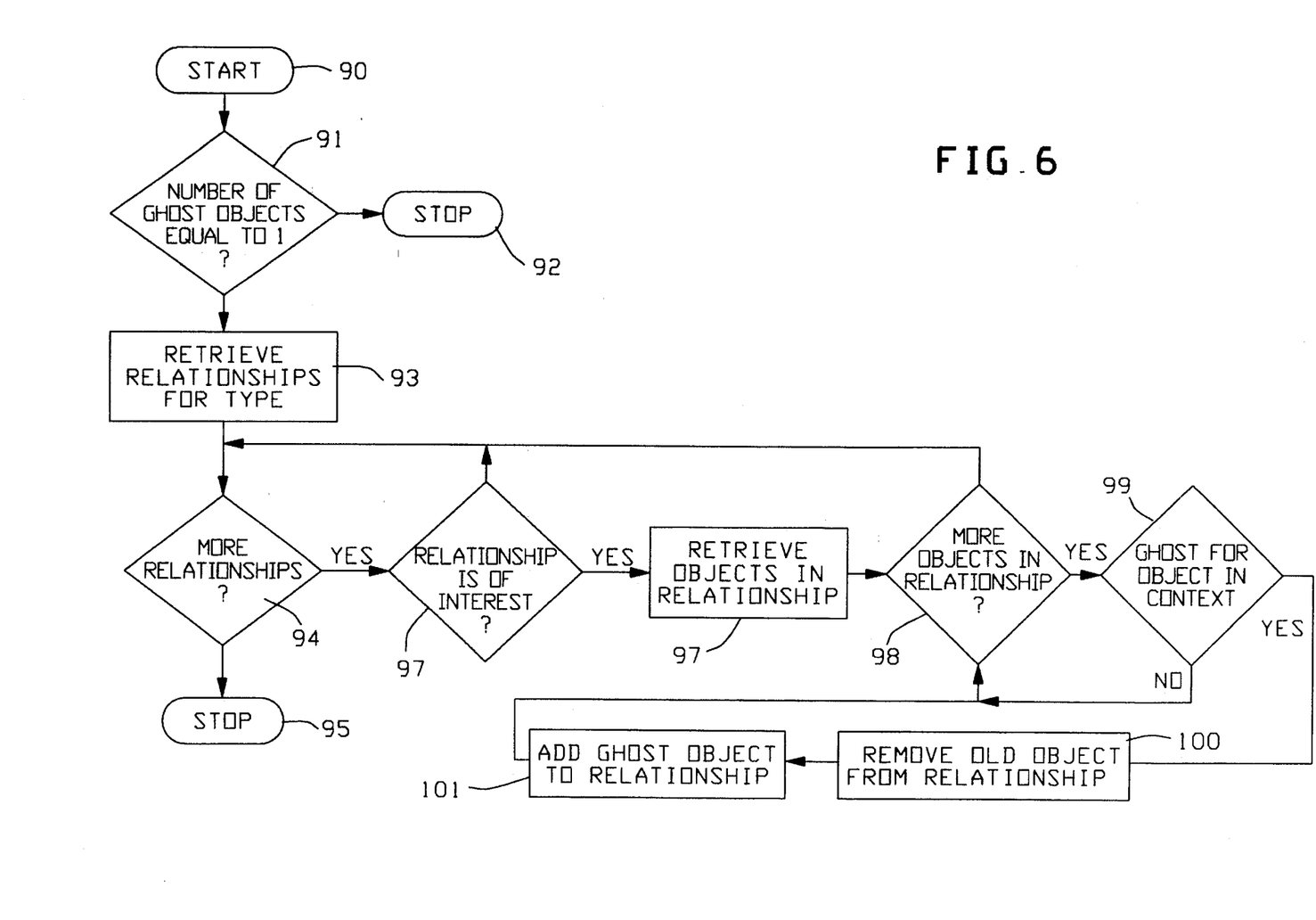
FIG. 6 is a flow chart showing the steps for fixing up references as required for the reserving operation.

Referring now to FIG. 6, a flow chart illustrates the steps for fixing up the references as referred to hereinabove. The process begins with a START bubble 90. If there is only one ghost object in the current context, no fixup of references is needed and the routine returns the object to the caller, decision diamond 91 and process block 92. On the other hand, if there are more than one ghost objects in the current context, then a branch is made to a process block 93 to retrieve the references for type. As a result of this process step a collection of references is returned. Each reference in the collection is examined beginning with a decision diamond 94 asking for more references and once depleted from the collection the process stops as depicted by a bubble 95.

The first step in the examination is to determine if the reference is of interest, decision diamond 96. If the reference is not of interest, then a return is made back to the decision diamond 94 for the next reference. If the reference is of interest, then a branch is taken to a process block 97 depicting a step of retrieving the objects in that reference. A collection of objects is returned and each examined as depicted by a decision diamond 98. If the object has a ghost object in the current context, that object should be used instead, as represented by a decision diamond 99. Next, the old object is removed from the reference, process block 100; and, a new object is inserted in the same place in the reference, process block 101.

Figure 7:
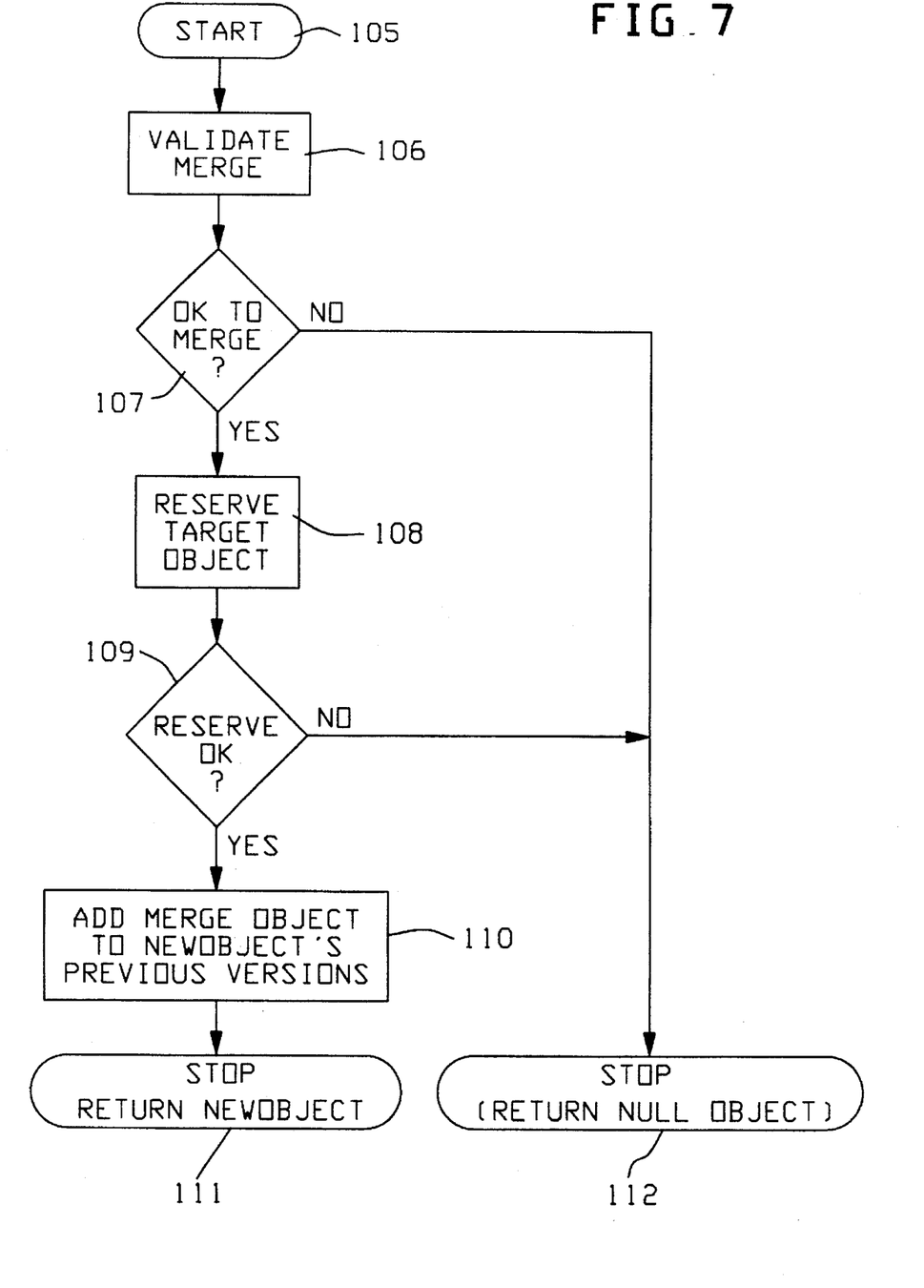
FIG. 7 is a flow chart showing the steps for performing a merge operation.

Referring now to FIG. 7, the steps of the merge process are illustrated in a flow chart. The process begins with a START bubble 105, followed by a step of validating a merge request-process block 106. Validating the merge request is performed to insure that neither the target object nor the object to merge are in a ghost state, that the two objects are not in fact the same object, that the two objects are members of the same version graph; and, that the merge will not cause two objects from the same variant branch to be merged into a new object also on the same variant branch. This process step is followed by a decision diamond 107 determining if it is "OK" to merge, meaning that the target state indicates that the merge request is valid. Next, the target object is reserved, as depicted by a process block 108. The Reserve operation is explained in greater detail hereinabove and illustrated in FIGS. 5a and 5b.

The next step in this process is to determine if the reserve was "OK", as depicted by a decision diamond 109. If the reserve was successful, then the object which was merged with the target object is added to the list of previous version of the new ghost object and return the derived ghost object to the caller, process blocks 110 and 111, respectively. If the either the merge was unsuccessful (diamond 107) or the reserve was unsuccessful (diamond 109), then a null object is returned to the caller, process block 112.

Figure 8:
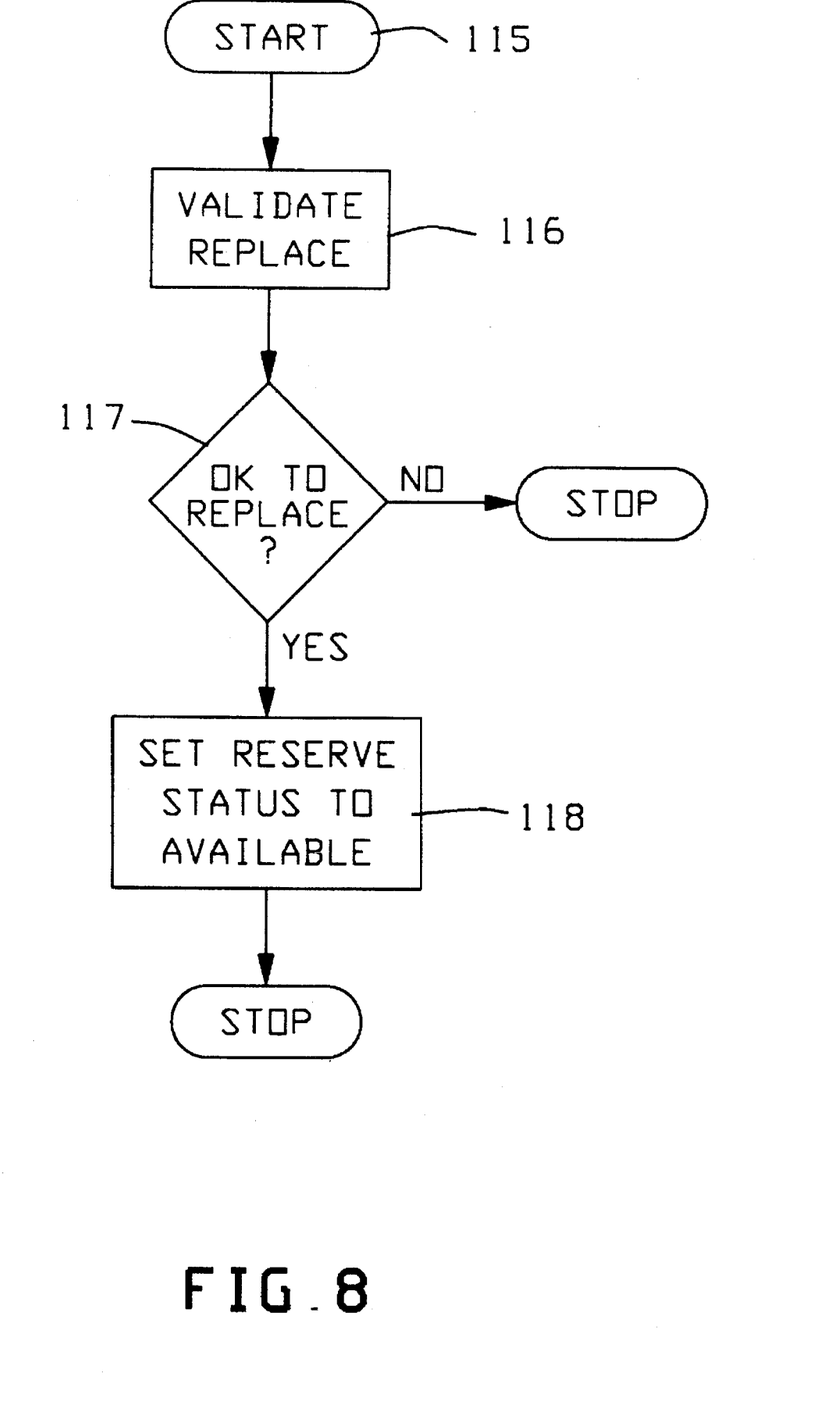
FIG. 8 is a flow chart illustrating the steps for replacing an object operation.

Referring now to FIG. 8, the process of replacing an object in the repository is shown. The process begins with a START bubble 115, followed by a validate replace operation, process block 116. Validating the replace request insures that the target object is in a ghost state and that the target object is in the context of the requestor. If the target object state indicates that the replace request is valid, as depicted by a decision diamond 117, then the reserve status of the target object is set to available, process block 118.

Figure 9:
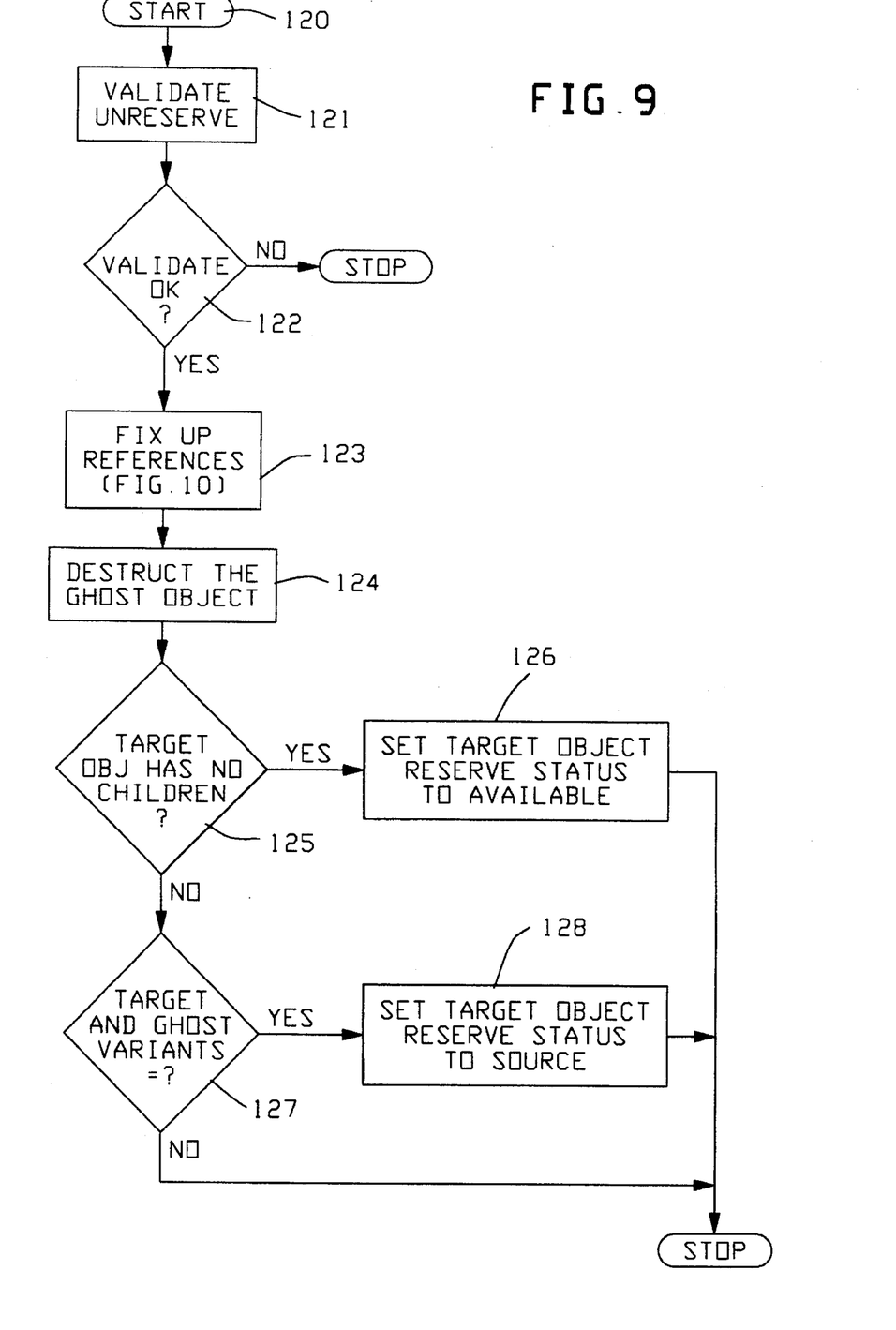
FIG. 9 is a flow chart illustrating the unreserving of an object operation.

Referring now to FIG. 9, the process steps of performing an unreserve operation are shown in a flow chart. The process begins with a START bubble 120, followed by a validate unreserve step, process block 121. validating the unreserve request insures that the target object is not in a ghost state and that the target has a ghost in the requestor's context. If the target object state indicates that the unreserve request is valid, at a decision diamond 122, then the references to and from the ghost reference are fixed up as depicted by a process block 123. The details of the fixing up routine are amplified hereinbelow and illustrated in FIG. 10. Next, the ghost object is destructed since its state is undesired, process block 124. An inquiry is next made as to whether or not the target object has other descendants, decision diamond 125. If the target object has descendants then the target object reserve status is set to available, process block 126. If the target object has no other descendants, then another inquiry is made as to whether or not the variant names of the target object and the now destructed ghost object had been the same, decision diamond 127. If the answer to this inquiry is YES, then the target object's reserve status is set to source, process block 128.

Figure 10:
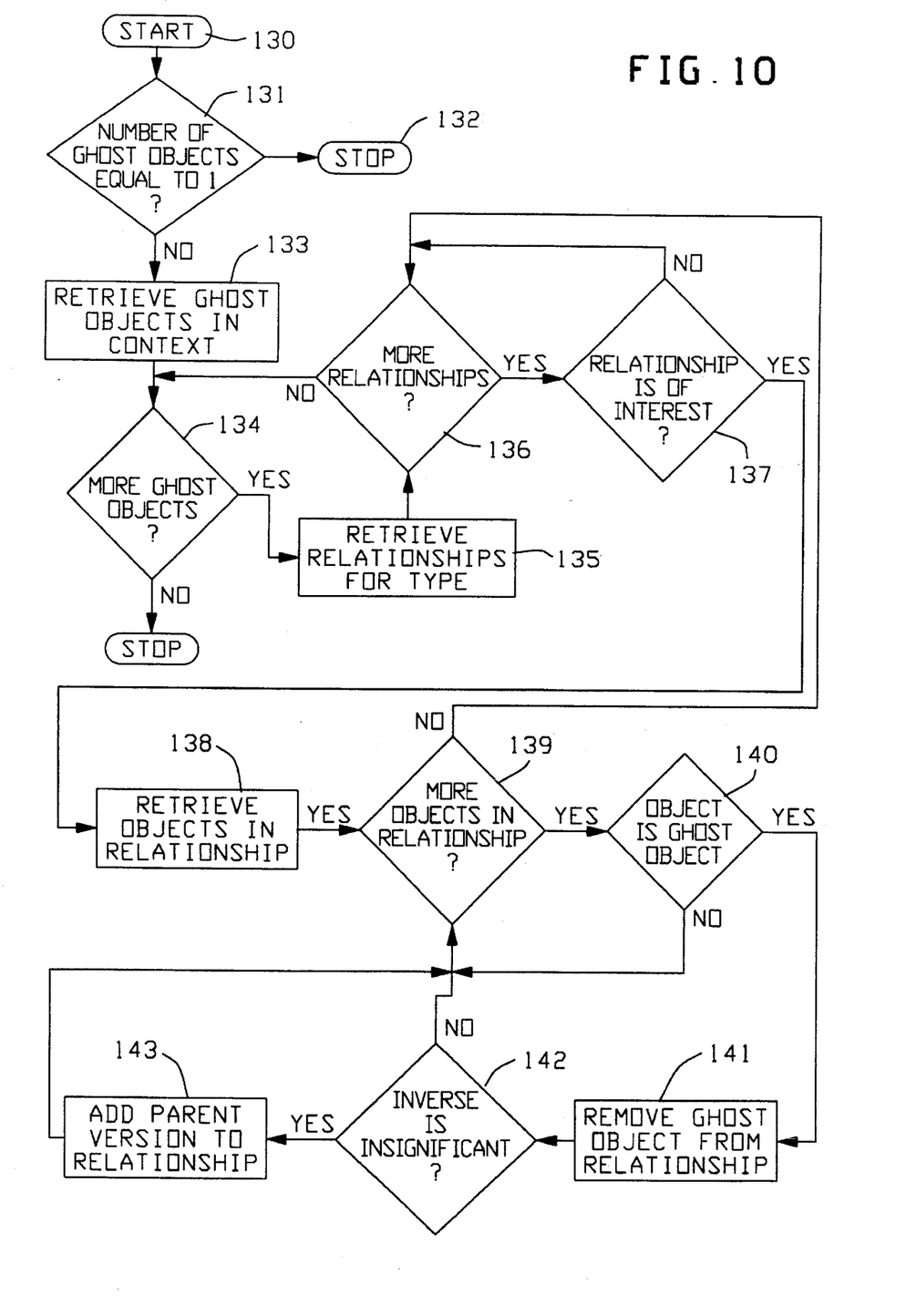
FIG. 10 is a flow chart illustrating the steps for fixing up references for the unreserve operation.

Referring now to FIG. 10, the steps of the fixUpReferences process as called from the unreserve operation are shown. The process begins with a START bubble 130, followed by an inquiry as to the number of ghost objects, decision diamond 131. If there is only one ghost object in the current context, no fixup of references is needed and the process returns to the caller, process block 132. Next, the collection of ghost objects in the current context is retrieved, process block 133. Each object in the collection is examined beginning with a decision diamond 134. Following this step, the references for the type are retrieved, process block 135. A collection of objects are returned by the above-referenced MetaData service 22b. Each reference in the collection is examined, decision diamond 136.

If a reference is of interest then the objects in the reference are retrieved, decision diamond 137 and process block 138, respectively. That is, if the reference is to a subtype of a versioned object and its to the same type as a subtype of the type of the object being unreserved, then this step is continued. Each of the objects in the collection are examined, decision diamond 139. Following this step, an inquiry is made a whether or not the object is a ghost object, decision diamond 140. If the object is the ghost object that will be deleted, then this step is continued. Next, the ghost object is removed from the reference, process block 141. Is the inverse of the reference insignificant, decision diamond 142. That is, if the inverse of the reference is insignificant, the parent version of the ghost object can be updated. Finally, the ghost object is updated to point to the parent of the ghost object being deleted, process block 143.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a user interface, a memory, an object-oriented repository, a repository program operating in said computer system executing a method responsive to a user request for maintaining an historical state of an object stored in said repository comprising the steps of:

a. if a new logical object is requested, constructing a new versioned object;

b. if a new logical object is not requested, retrieving from said repository an existing object on which a new state is to be based;

c. if said new state is derived from two objects, retrieving from said repository the other object on which said new state is to be based;

d. deriving a new object from said existing object if said new object state is not derived from two objects, and if said new object state is derived from two objects, deriving a new object by merging said existing object and said other object by:

i) validating merge request by insuring that neither said existing object nor said other object are in a ghost state, the two objects to be merged are not the same object, the two objects are members of same version graph and merge will not cause two objects from the same variant branch to be merged into a new object also on the same variant branch;

ii) reserving said existing object if said validating step indicates that the merge request is valid; and, iii) if said reserve operation was successful, adding said other object which was merged with said existing object to a list of previous versions of said new object and return derived said new object to caller;

e. receiving any necessary changes to state of said new object;

f. unreserving said new object if said changes are not to be retained, and if said changes are to be retained, replacing said new object by:

i) validating replace request by insuring that said new object is in a ghost state and said new object is in the context of the requestor; and, ii) setting reserve status of said new object to available if said validating step indicates that said replace request is valid;

g. continuously repeating all steps hereof for each user request.

2. A method as in claim 1 further including the steps of bringing said new object into existence and establishing initial values of properties of superclasses of said new object.

3. The method as in claim 2 further including the steps of setting reserve status of said new object to ghost, setting next and previous versions of said new object to null and variant name to blank, version number to one and returning said new object.

4. The method as in claim 1 further including the step of returning a null object to the caller if said merge operation was not successful.

5. In a computer system having a user interface, a memory, an object-oriented repository, a repository program operating in said computer system executing a method responsive to a user request for maintaining a historical state of an object stored in said repository comprising the steps of:

a. if a new logical object is requested, constructing a new versioned object;

b. if a new logical object is not requested, retrieving from said repository an existing object on which a new state is to be based;

c. if said new state is derived from two objects, retrieving from said repository the other object on which said new state is to be based;

d. deriving a new object from said existing object if said new object state is not derived from two objects, and if said new object state is derived from two objects, deriving a new object by merging said existing object and said other object by:

i) validating merge request by insuring that neither said existing object nor said other object are in a ghost state, the two objects to be merged are not the same object, the two objects are members of same version graph and merge will not cause two objects from the same variant branch to be merged into a new object also on the same variant branch;

ii) reserving said existing object if said validating step indicates that the merge request is valid by:

A) validating a reserve request by insuring that requested variant name is valid and said existing object does not have a reserve status of ghost; verifying that if reserve status of said existing object is source/read only, and if so, that said object is reserved on a different variant; verifying that maximum number of immediate descendants allowed for one object will not be exceeded; verifying that maximum allowable depth of version tree will not be exceeded;

B) duplicating said existing object to derive a starting state for said new object;

C) adding said new object on a list of objects in working context;

D) setting reserve status of said existing object to read only if reserve was performed on same branch as said existing object;

E) adding said new object to next version list of said existing object so that descendant relationship is captured; and, F) fixing up references.

iii) if said reserve operation was successful, adding said other object which was merged with said existing object to a list of previous versions of said new object and return derived said new object to caller;

e. receiving any necessary changes to state of said new object;

f. unreserving said new object if said changes are not to be retained, and if said changes are to be retained, replacing said new object by:

i) validating replace request by insuring that said new object is in a ghost state and said new object is in the context of requestor; and, ii) setting reserve status of said new object to available if said validating step indicates that the replace request is valid;

g. continuously repeating all steps hereof for each user request.

6. A process as in claim 5 further including the steps of finding variant branch in version graph in which ghost object is created and returning a null object if said variant branch is found, thereby obviating steps d through f thereof.

7. A process as in claim 5 further including the step of returning a reserved object if said existing object is already reserved as desired, thereby obviating steps d through f thereof.

8. A process as in claim 5 further including the step of returning a null object if said existing object is reserved on a different variant, thereby obviating steps d through f thereof.

9. A process as in claim 5 further including the step of returning a null object if reserve status is not available for said existing object, thereby obviating steps d through f thereof.

10. The process as in claim 5 further including the step of setting reserve status of said existing object to source if reserve status of said object is available.

11. The process as in claim 5 wherein said step of fixing up further includes the steps of:

a. retrieving references for the type of said existing object;

b. examining each reference in a collection of references returned in response to the first step hereof to determine if this reference is of interest;

c. retrieving objects in each reference in said collection of references;

d. examining said retrieved objects to determine if an object has a ghost object in current context, and if so, such object is to be used instead of said retrieved object; whereby structures originally created by said repository are maintained as objects are reserved;

e. removing said retrieved object from said reference; and, inserting said ghost object in the same place in said reference.

12. A method as in claim 5 wherein said step of deriving a new object from said existing object further comprises reserving said existing object by:

i) validating a reserve request by insuring that requested variant name is valid and said existing object does not have a reserve status of ghost; verifying that if reserve status of said existing object is source/read only, and if so, that said object is reserved on a different variant; verifying that maximum number of immediate descendants allowed for one object will not be exceeded; verifying that maximum allowable depth of version tree will not be exceeded;

ii) duplicating said existing object to derive a starting state for said new object;

iii) adding said new object on a list of objects in working context;

iv) setting reserve status of said existing object to read only if reserve was performed on same branch as said existing object;

v) adding said new object to next version list of said existing object so that descendant relationship is captured; and, vi) fixing up references.

13. In a computer system having a user interface, a memory, an object-oriented repository, a repository program operating in said computer system executing a method responsive to a user request for maintaining an historical state of an object stored in said repository comprising the steps of:

a. if a new logical object is requested, constructing a new versioned object;

b. if a new logical object is not requested, retrieving from said repository an existing object on which a new state is to be based;

c. if said new state is derived from two objects, retrieving from said repository the other object on which said new state is to be based;

d. deriving a new object from said existing object if said new object state is not derived from two objects, and if said new object state is derived from two objects deriving a new object by merging said existing and said ether object by:

i) validating merge request by insuring that neither said existing object nor said other object are in a ghost state, the two objects to be merged are not the same object, the two objects are members of same version graph and merge will not cause two objects from the same variant branch to be merged into a new object also on the same variant branch;

ii) reserving said existing object if said validating step indicates that the merge request is valid; and, iii) if said reserve operation was successful, adding said other object which was merged with said existing object to a list of previous versions of said new object and return derived said new object to caller;

e. receiving any necessary changes to state of said new object;

f. unreserving said new object if said changes are not to be retained by:
   i) validating unreserve request by insuring that said existing object is not in a ghost state and said existing object has a ghost object in the context of requestor;
   ii) fixing up references to/from ghost object;
   iii) destructing said ghost object since its state is undesired;
   iv) setting said existing object's reserve status to available if said existing object has no other descendants; and,
   v. setting said existing object's reserve status to source if variant names of said object and said destructed ghost object had been the same, and said object has other descendants;

g. and if said changes are to be retained, replacing said new object with said merged and changed object by:

i) validating replace request by insuring that said object is in a ghost state and said object is in the context of the requestor; and,
   ii) setting reserve status of said object to available if said object state indicates that the replace request is valid;

h. continuously repeating all steps hereof for each user request.

14. The process as in claim 13 wherein said step of fixing up references includes the steps of:

a. retrieving a collection of ghost objects in current context;

b. examining each object in said retrieved collection and retrieving references for type thereof;

c. retrieving objects from each of said references in said collection;

d. deleting said new object found in each of said references in said collection; and e. updating ghost object to point to parent of said new object being deleted.

* * * * *